(12) United States Patent
Stein

(10) Patent No.: US 6,725,732 B1
(45) Date of Patent: Apr. 27, 2004

(54) CLOTHES DRYER WITH SAFETY FEATURE

(76) Inventor: Richard Stein, 27233 Blakely Pl., Valencia, CA (US) 91354

( * ) Notice: Subject to any disclaimer, the term of this patent is extended or adjusted under 35 U.S.C. 154(b) by 0 days.

(21) Appl. No.: 10/369,466

(22) Filed: Feb. 20, 2003

(51) Int. Cl.[7] .............................. G01P 5/06; F26B 19/00
(52) U.S. Cl. ........................................ 73/861.55; 34/89
(58) Field of Search ..................... 73/861.85, 861.88, 73/861.86; 34/82, 88, 89, 134, 138, 140, 235, 595, 604.79; 116/264, 273, 276

(56) References Cited

U.S. PATENT DOCUMENTS

| | | | | |
|---|---|---|---|---|
| 4,206,552 A | * | 6/1980 | Pomerantz et al. | 34/445 |
| 4,581,930 A | * | 4/1986 | Komons | 73/204.17 |
| 4,622,759 A | * | 11/1986 | Abe et al. | 34/546 |
| 4,700,492 A | * | 10/1987 | Werner et al. | 34/403 |
| 5,042,170 A | * | 8/1991 | Hauch et al. | 34/82 |
| 5,487,311 A | * | 1/1996 | Guativa et al. | 73/861.77 |
| 5,497,563 A | * | 3/1996 | Mayfield | 34/572 |
| 5,564,831 A | * | 10/1996 | Bashark | 374/141 |
| 5,809,663 A | * | 9/1998 | Perque | 34/93 |
| 5,860,224 A | * | 1/1999 | Larson | 34/418 |

* cited by examiner

Primary Examiner—Harshad Patel

(57) ABSTRACT

A clothes dryer with safety feature of lint airflow obstruction detection comprises a frame connectable to a conventional clothes dryer. An anemometer sensor grid connected to the frame. The anemometer sensor grid is capable of detecting airflow therethrough. A light is electrically connected to the anemometer sensor grid.

19 Claims, 4 Drawing Sheets

CLOTHES DRYER WITH SAFETY FEATURE

BACKGROUND OF THE INVENTION

1. Field of the Invention

The present invention relates to a clothes dryer with safety feature for use in connection with clothes dryers. The clothes dryer with safety feature has particular utility in connection with clothes dryer with clogged lint filter alarm.

2. Description of the Prior Art

Clothes dryer with safety features are desirable for providing the convenience of a domestic clothes dryer with the peace of mind that comes from knowing that the dryer will shut itself off in the case of an overheating event due to lint accumulation.

The use of clothes dryers is known in the prior art. For example, U.S. Pat. No. 3,718,982 to Deaton discloses an excess lint indicator for a clothes dryer that has a circulating airflow duct system including a tumbling drum and lint filter for filtering lint form air leaving a tumbling drum. An excess lint indicating system includes a visible signal light on the dryer and an operating switch therefor. The switch is operated by a pressure actuated surface which reposes against the cloth like screen of the filter, whereby the screen forces the switch as lint accumulates to energize the signal light. However, the Deaton '982 patent does not have a sensor grid mounted to the bottom of a clothes dryer and capable of detecting the presence of lint.

Similarly, U.S. Pat. No. 3,639,998 to Mason discloses a filter condition indicator for a domestic close dryer responsive to changes in a pressure drop across the filter positioned in an air exhaust passage to provide a continuously visible signal that is terminated only by manual reset operation. The indicator assembly includes a light-transmitting member and a diaphragm movable between two positions. The light-transmitting member providing a visible signal on the control console of the dryer when the diaphragm is in one position. The diaphragm is responsive to changes in the pressure drop across the filter to move to the position in which the light-transmitting rod provides a visible signal on the console. However, the Mason '998 patent does not have a sensor grid mounted to the bottom of a clothes dryer and capable of detecting the presence of lint.

Lastly, U.S. Pat. No. 5,097,606 to Harmelink, et al. discloses a lint filter signal for automatic clothes dryer wherein the posture of a switch in the lint filter system is monitored and a signal to CHECK FILTER is displayed if the switch posture has not changed. The switched is a reed switch mounted stationary on the lint filter assembly and a magnet operator is attached to the removable filter screen. Movement of the filter screen into and out of filtering position in the lint filter assembly of the exhaust duct changes the posture of the magnet operated reed switch. Change of posture of the switch through its cycle impresses a change of voltage on the microprocessor. The microprocessor effects control over the CHECK FILTER signal that is visually illuminated on a VFD tube; such that, if the microprocessor sees the cycling of the switch the CHECK FILTER signal is extinguished. However, the Harmelink, et al. '606 patent does not have a sensor grid mounted to the bottom of a clothes dryer and capable of detecting the presence of lint.

While the above-described devices fulfill their respective, particular objectives and requirements, the aforementioned patents do not describe a clothes dryer with safety feature that allows clothes dryer with clogged lint filter alarm. The Deaton '982, Mason '998 and Harmelink, et al. '606 patents make no provision for a sensor grid mounted to the bottom of a clothes dryer and capable of detecting the presence of lint.

Therefore, a need exists for a new and improved clothes dryer with safety feature which can be used for clothes dryer with clogged lint filter alarm. In this regard, the present invention substantially fulfills this need. In this respect, the clothes dryer with safety feature according to the present invention substantially departs from the conventional concepts and designs of the prior art, and in doing so provides an apparatus primarily developed for the purpose of clothes dryer with clogged lint filter alarm.

SUMMARY OF THE INVENTION

In view of the foregoing disadvantages inherent in the known types of clothes dryers now present in the prior art, the present invention provides an improved clothes dryer with safety feature, and overcomes the above-mentioned disadvantages and drawbacks of the prior art. As such, the general purpose of the present invention, which will be described subsequently in greater detail, is to provide a new and improved clothes dryer with safety feature and method which has all the advantages of the prior art mentioned heretofore and many novel features that result in a clothes dryer with safety feature which is not anticipated, rendered obvious, suggested, or even implied by the prior art, either alone or in any combination thereof.

To attain this, the present invention essentially comprises a frame connectable to a conventional clothes dryer. An anemometer sensor grid connected to the frame. The anemometer sensor grid is capable of detecting airflow therethrough. A light is electrically connected to the anemometer sensor grid.

There has thus been outlined, rather broadly, the more important features of the invention in order that the detailed description thereof that follows may be better understood and in order that the present contribution to the art may be better appreciated.

The invention may also include a heater grid, a standoff, a power source connection and a relay. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved clothes dryer with safety feature that has all of the advantages of the prior art clothes dryers and none of the disadvantages.

It is another object of the present invention to provide a new and improved clothes dryer with safety feature that may be easily and efficiently manufactured and marketed.

An even further object of the present invention is to provide a new and improved clothes dryer with safety feature that has a low cost of manufacture with regard to both materials and labor, and which accordingly is then susceptible of low prices of sale to the consuming public, thereby making such clothes dryer with safety feature economically available to the buying public.

Still another object of the present invention is to provide a new clothes dryer with safety feature that provides in the apparatuses and methods of the prior art some of the advantages thereof, while simultaneously overcoming some of the disadvantages normally associated therewith.

Lastly, it is an object of the present invention is to provide a clothes dryer with safety feature for clothes dryer with clogged lint filter alarm.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
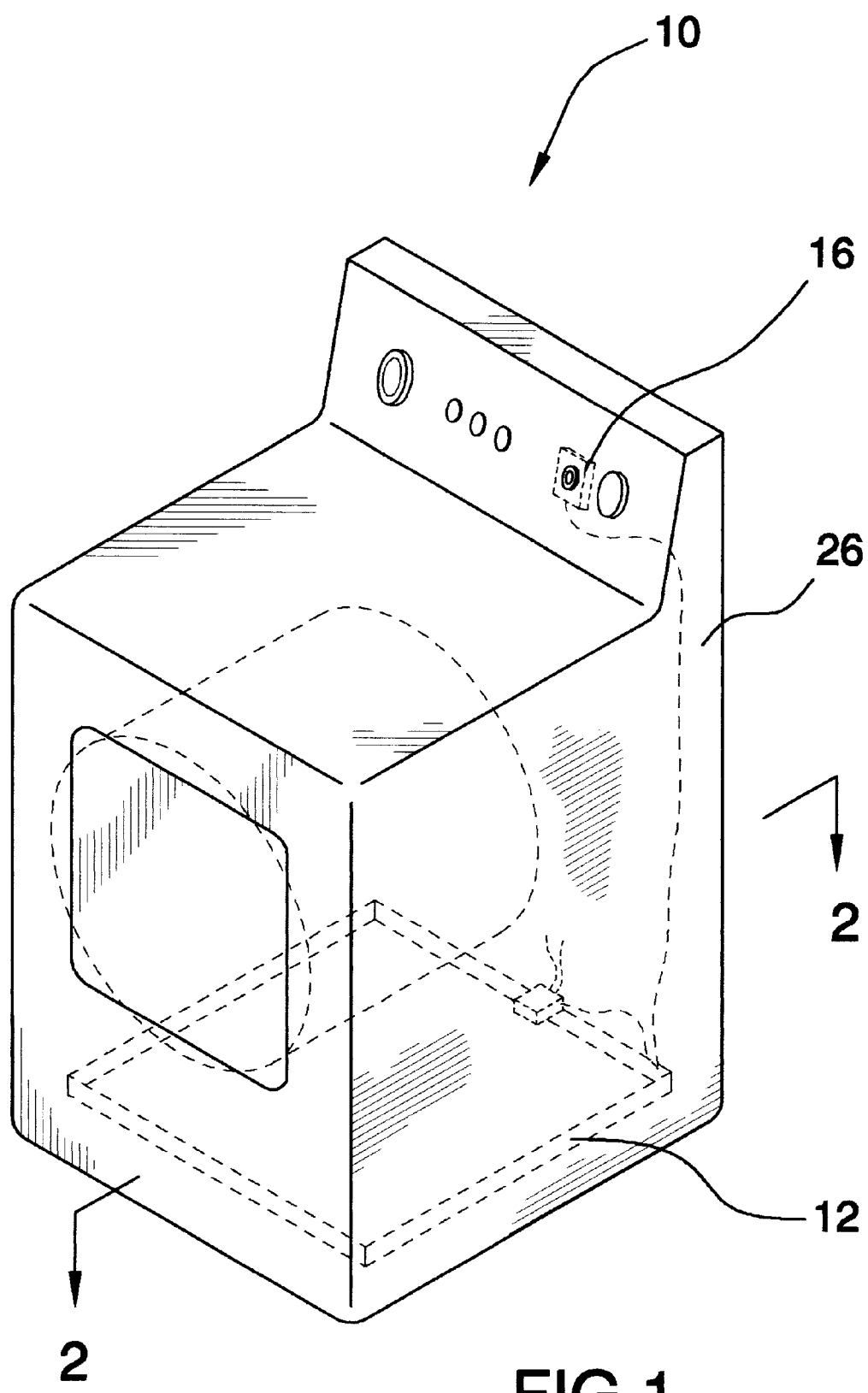
FIG. 1 is a top perspective view of the preferred embodiment of the clothes dryer with safety feature constructed in accordance with the principles of the present invention.

Referring now to the drawings, and particularly to FIGS. 1–4, a preferred embodiment of the clothes dryer with safety feature of the present invention is shown and generally designated by the reference numeral 10.

In FIG. 1, a new and improved clothes dryer with safety feature 10 of the present invention for clothes dryer with clogged lint filter alarm is illustrated and will be described. More particularly, the clothes dryer with safety feature 10 has a steel frame 12 connectable to a conventional clothes dryer 26. A light 16 is electrically connected to an anemometer sensor grid 14.

Figure 2:
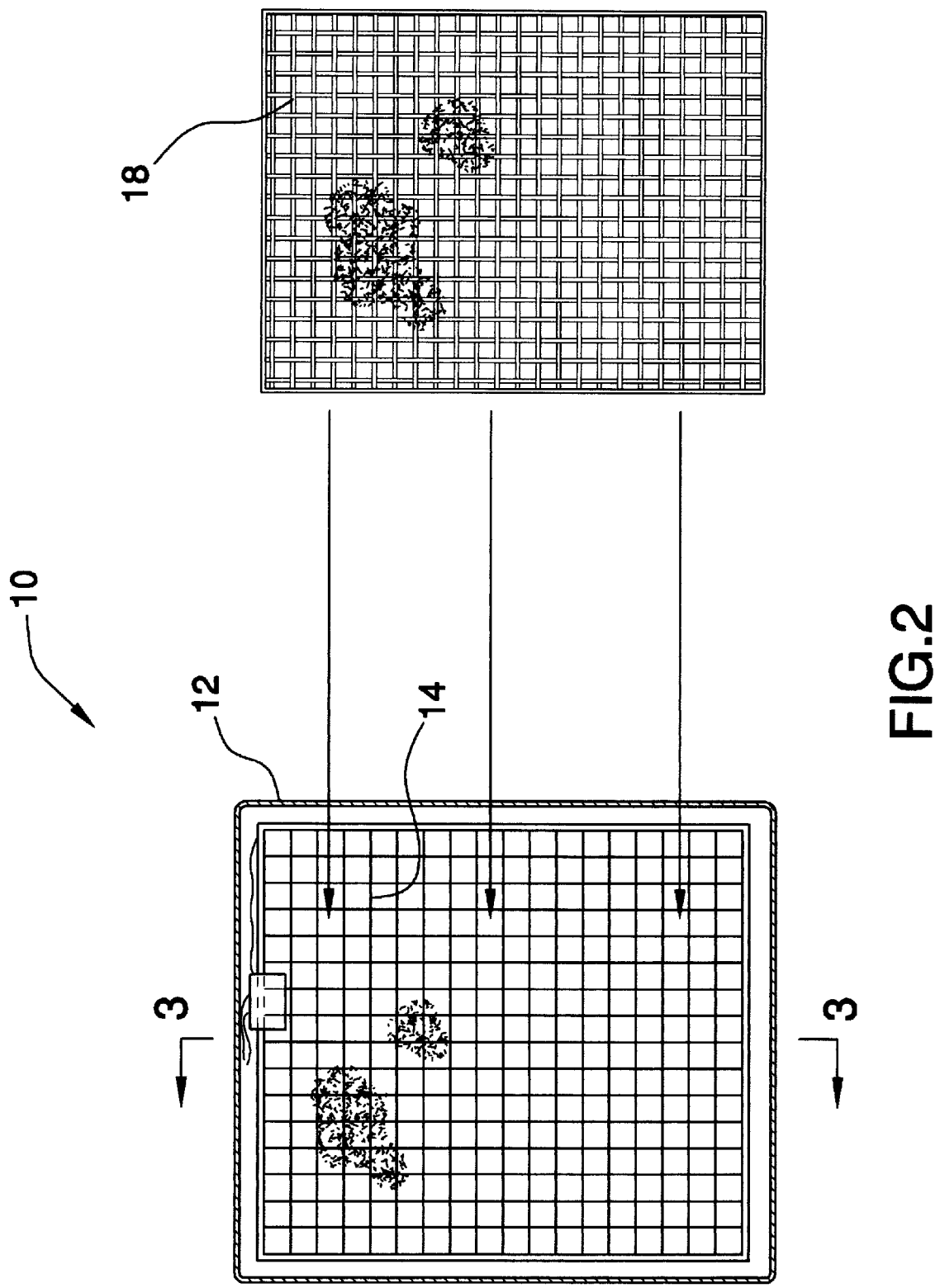
FIG. 2 is a section 2—2 view of FIG. 1 of the clothes dryer with safety feature of the present invention.

In FIG. 2, the clothes dryer with safety feature is illustrated and will be described. More particularly, the clothes dryer with safety feature 10 has the anemometer sensor grid 14 connected to the frame 12. The anemometer sensor grid 14 is capable of detecting airflow therethrough. The anemometer sensor grid 14 is comprised of series electrically connected thermistors. The anemometer sensor grid 14 is substantially rectangular in shape and planar. A heater grid 18 is connected to the frame 12. The heater grid 18 is disposed adjacent to the anemometer sensor grid 14.

Figure 3:
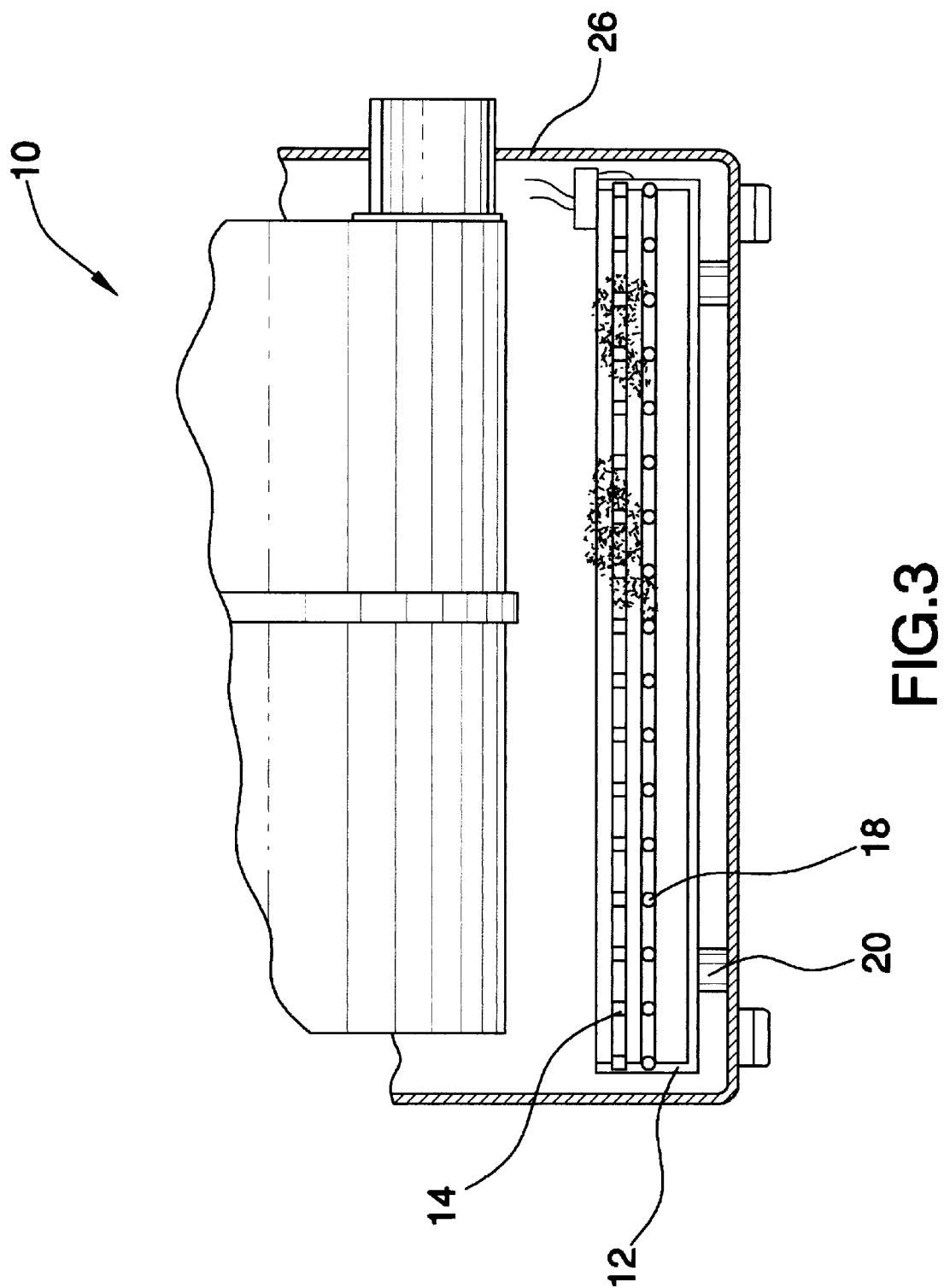
FIG. 3 is a section 3—3 view of FIG. 2 of the clothes dryer with safety feature of the present invention.

In FIG. 3, the clothes dryer with safety feature is illustrated and will be described. More particularly, the clothes dryer with safety feature 10 has the steel frame 12 connectable to the conventional clothes dryer 26. The anemometer sensor grid 14 is connected to the frame 12. The anemometer sensor grid 14 is capable of detecting airflow therethrough. The anemometer sensor grid 14 is comprised of series electrically connected thermistors. The heater grid 18 is connected to the frame 12. The heater grid 18 is disposed adjacent to the anemometer sensor grid 14. A plurality of standoffs 20 are connected to the frame 12.

Figure 4:
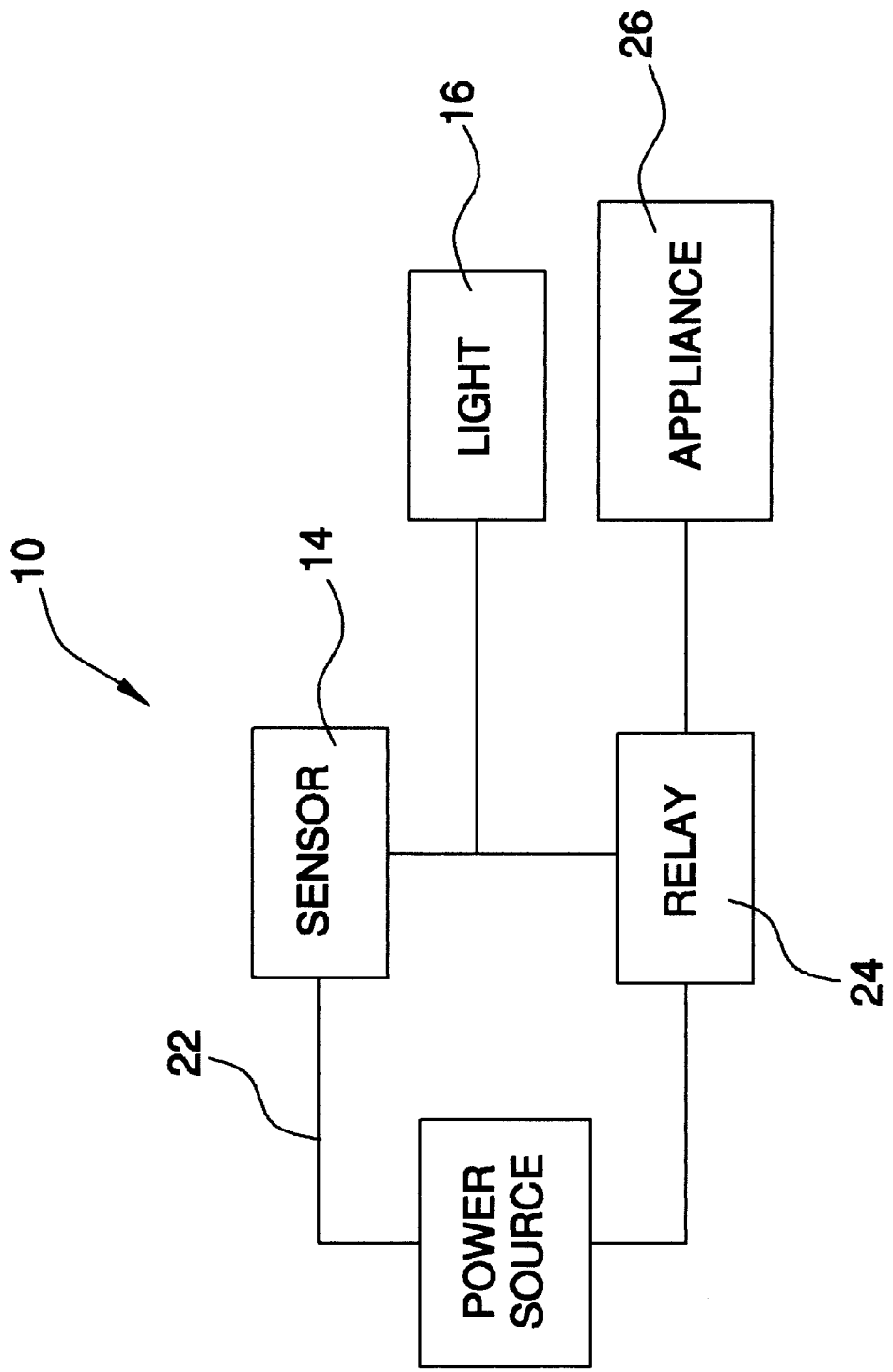
FIG. 4 is a block diagram view of the clothes dryer with safety feature of the present invention.

In FIG. 4, the clothes dryer with safety feature is illustrated and will be described. More particularly, the clothes dryer with safety feature 10 has the anemometer sensor grid 14 is comprised of series electrically connected thermistors. The light 16 is electrically connected to the anemometer sensor grid 14. The light 16 is capable of flashing. A power source connection 22 is electrically connected to the anemometer sensor grid 14. A relay 24 is electrically connected to the anemometer sensor grid 14. The relay 24 is electrically connected to the conventional clothes dryer 26.

In use it can now be understood that the clothes dryer would be used in a conventional fashion. If the airflow under the dryer were obstructed by lint the light 16 would flash warning the user of the unsafe condition.

While a preferred embodiment of the clothes dryer with safety feature has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable temperature sensor may be used instead of the air flow described. And although clothes dryer with clogged lint filter alarm have been described, it should be appreciated that the clothes dryer with safety feature herein described is also suitable for any filter system that may cause a system over temperature.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A clothes dryer with safety feature comprising:

a frame connectable to a conventional clothes dryer;

an anemometer sensor grid connected to said frame, said anemometer sensor grid capable of detecting airflow therethrough; and a light electrically connected to said anemometer sensor grid.

2. The clothes dryer with safety feature of claim 1 further comprising:
a heater grid connected to said frame, said heater grid disposed adjacent to said anemometer sensor grid.

3. The clothes dryer with safety feature of claim 1 further comprising:
a plurality of standoffs connected to said frame.

4. The clothes dryer with safety feature of claim 1 wherein:
said light is capable of flashing.

5. The clothes dryer with safety feature of claim 1 wherein:
said anemometer sensor grid is substantially rectangular in shape.

6. The clothes dryer with safety feature of claim 1 further comprising:
a power source connection electrically connected to said anemometer sensor grid.

7. The clothes dryer with safety feature of claim 1 further comprising:
a relay electrically connected to said anemometer sensor grid.

8. The clothes dryer with safety feature of claim 8 wherein:
said relay is electrically connected to said conventional clothes dryer.

9. The clothes dryer with safety feature of claim 1 wherein:
said frame is comprised of steel.

10. A clothes dryer with safety feature comprising:
a frame connectable to a conventional clothes dryer;
an anemometer sensor grid connected to said frame, said anemometer sensor grid capable of detecting airflow therethrough, said anemometer sensor grid is comprised of series electrically connected thermistors; and
a light electrically connected to said anemometer sensor grid.

11. The clothes dryer with safety feature of claim 10 further comprising:
a heater grid connected to said frame, said heater grid disposed adjacent to said anemometer sensor grid.

12. The clothes dryer with safety feature of claim 11 further comprising:
a plurality of standoffs connected to said frame.

13. The clothes dryer with safety feature of claim 12 wherein:
said light is capable of flashing.

14. The clothes dryer with safety feature of claim 13 wherein:
said anemometer sensor grid is substantially rectangular in shape.

15. The clothes dryer with safety feature of claim 14 further comprising:
a power source connection electrically connected to said anemometer sensor grid.

16. The clothes dryer with safety feature of claim 15 further comprising:
a relay electrically connected to said anemometer sensor grid.

17. The clothes dryer with safety feature of claim 16 wherein:
said relay is electrically connected to said conventional clothes dryer.

18. The clothes dryer with safety feature of claim 17 wherein:
said frame is comprised of steel.

19. A clothes dryer with safety feature comprising:
a steel frame connectable to a conventional clothes dryer;
an anemometer sensor grid connected to said frame, said anemometer sensor grid capable of detecting airflow therethrough, said anemometer sensor grid is comprised of series electrically connected thermistors, said anemometer sensor grid is substantially rectangular in shape;
a light electrically connected to said anemometer sensor grid, said light is capable of flashing;
a heater grid connected to said frame, said heater grid disposed adjacent to said anemometer sensor grid;
a plurality of standoffs connected to said frame;
a power source connection electrically connected to said anemometer sensor grid; and
a relay electrically connected to said anemometer sensor grid, said relay is electrically connected to said conventional clothes dryer.

* * * * *